US008074049B2

(12) United States Patent
Gelson et al.

(10) Patent No.: US 8,074,049 B2
(45) Date of Patent: Dec. 6, 2011

(54) ONLINE BACKUP SYSTEM WITH GLOBAL TWO STAGED DEDUPLICATION WITHOUT USING AN INDEXING DATABASE

(75) Inventors: Thomas M. Gelson, Marion, MA (US); Alexander Stoev, Woodbridge (CA)

(73) Assignee: Nine Technology, LLC, Middleboro, MA (US)

( * ) Notice: Subject to any disclaimer, the term of this patent is extended or adjusted under 35 U.S.C. 154(b) by 406 days.

(21) Appl. No.: 12/490,542

(22) Filed: Jun. 24, 2009

(65) Prior Publication Data

US 2010/0058013 A1   Mar. 4, 2010

Related U.S. Application Data

(60) Provisional application No. 61/091,825, filed on Aug. 26, 2008.

(51) Int. Cl.
*G06F 12/00* (2006.01)

(52) U.S. Cl. ...................................... 711/216

(58) Field of Classification Search .................. None
See application file for complete search history.

(56) References Cited

U.S. PATENT DOCUMENTS

| | | | |
|---|---|---|---|
| 5,452,447 | A | 9/1995 | Nelson et al. |
| 5,778,395 | A * | 7/1998 | Whiting et al. ................ 1/1 |
| 5,974,426 | A | 10/1999 | Lee et al. |
| 6,026,166 | A | 2/2000 | LeBourgeois |
| 6,959,384 | B1 | 10/2005 | Serret-Avila |
| 7,281,097 | B1 | 10/2007 | Lawson et al. |
| 7,373,464 | B2 | 5/2008 | Zhu et al. |
| 7,516,116 | B2 * | 4/2009 | Shen et al. ................... 1/1 |
| 7,562,200 | B1 | 7/2009 | Chatterjee et al. |
| 7,610,383 | B2 | 10/2009 | Britto et al. |
| 2002/0103943 | A1 | 8/2002 | Lo et al. |
| 2002/0161917 | A1 | 10/2002 | Shapiro et al. |
| 2005/0125598 | A1 | 6/2005 | Gilfix et al. |
| 2006/0069861 | A1 | 3/2006 | Amano |
| 2006/0074912 | A1 | 4/2006 | Borthakur et al. |
| 2008/0201488 | A1 | 8/2008 | Kenner et al. |

* cited by examiner

*Primary Examiner* — Duc Doan
(74) *Attorney, Agent, or Firm* — Duane Morris LLP

(57) ABSTRACT

An encryption for a distributed global online backup system with global two-stage deduplication in the absence of an indexing database where data blocks are encrypted using their SHA-1 signatures as encryption keys.

14 Claims, 15 Drawing Sheets

ONLINE BACKUP SYSTEM WITH GLOBAL TWO STAGED DEDUPLICATION WITHOUT USING AN INDEXING DATABASE

CROSS-REFERENCE TO RELATED APPLICATIONS

The present application claims priority to U.S. Provisional Patent Application 61/091,825, filed Aug. 26, 2008, the entirety of which is incorporated herein by reference.

COPYRIGHT CLAIM

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

Aspects of the invention relate to backup storage. More specifically, the invention relates to an online backup system offering global deduplication with enhanced restore performance.

BACKGROUND OF THE INVENTION

There are few online backup systems offering global deduplication on a file/block level. Traditionally, such backup systems either use a sharing algorithm that employs common encryption keys or the backup systems do not encrypt common files/blocks. One of the implications for the use of such systems is that the sharing of common files/blocks may be a potential security risk, or that such systems and methods nullify the benefits of global deduplication where some data blocks must be stored multiple times.

Existing online backup systems often consist of one or more multiple storage systems with numerous backup applications sending and/or retrieving data to/from the storage systems. Traditionally, such backup systems store data in a file system, which often have limited size, and are not able to scale billions of files.

There are conventional systems that store data on clustered file systems. These types of systems require very reliable high-performance storage systems that make the implementation very expensive. Moreover, such systems need many data storage nodes which, on a global scale, often cause a bottleneck. The requirement for storing large number of files increases when deduplication is needed on a block level. For example, if hundreds of millions of files were scheduled to be backed up, and each file contained an average of one thousand blocks of 4 kB, the storage system would need to be capable of handling hundreds of billions of files. Such large numbers of files are very difficult to catalog and handle. There are conventional online backup system implementations that store 500 million files. If, for example, each file had multiple versions, the number of protected files would grow dramatically. Such conventional systems are thus often impractical and inefficient. In other conventional systems, data is stored on virtual tape libraries. Such virtual tape libraries have limited capacity even if this capacity is in the range of gigabytes, terabytes or larger. If there were a need to store more data, more virtual tape libraries would need to be added to the system. In such situations however, the advantages of block level deduplication are lost with the addition of each new virtual tape library.

There are conventional systems that offer global block level deduplication. Such implementations have an indexing database that stores the signatures of the blocks. In global schemes such indexing databases become a bottleneck.

What is needed is an online backup system capable of storing unlimited numbers of files with unlimited size. Such online backup systems must not suffer from degradation in performance due to the very large number of files being protected. This new online backup system must be able to identify existing blocks and store them only once, thus offering global block level deduplication. This new online backup system must have built-in replication in order to offer redundancy and increased performance.

SUMMARY OF THE INVENTION

In one embodiment, a system to perform backup and restore functions for a computer system is presented. In this embodiment, a front end arrangement is provided, the arrangement configured to interface with a user, the interface allowing a user to select blocks of data to be at least one of backed up and restored. The front end arrangement is configured with a communication module, a backup restore module, a deduplication module, a compression module, a database module, an encryption module, a graphical interface unit and a database processing module. The system also provides a back end arrangement configured to interface with the front end arrangement, the back end arrangement having at least one server daemon that interacts with a distributed hash table, the back end arrangement further configured with at least one storage brick for storing data in the back end arrangement.

In another embodiment a method for storing information on a computer is provided. In this method, a user selects data to be backed up on the computer.

Next, data is authenticated for at least one of a user and an account. A hash code is then sent from a front end arrangement configured to interface with a user to a back end arrangement. Data is then checked of at least one of a scheme data partition map and a replica group membership map for the hash code obtained from the front end arrangement. Replica group members are then determined that can service the storage of the selected data in a storage brick. The front end arrangement is then connected to the selected storage brick through the group members determined for storing the selected data. A hash code key queue is then searched for the hash code from the selected data. Data is stored for the selected data when the hash code of the selected data is not in the hash code key queue. The hash code key queue is then updated with the hash code from the selected data.

In another embodiment, a method for restoring information saved on a computer is provided. In this embodiment, data is selected to be restored on the computer, the data previously stored on the computer. At least one of a user and an account for the data to be restored on the computer is authenticated before restoration is allowed. A hash code is then sent from a front end arrangement configured to interface with a user to a back end arrangement for authorized users or accounts. Data is then checked of at least one of a scheme data map and a replica group membership map for the hash code obtained from the front end arrangement. Replica group members are then determined that can access a storage brick containing the selected data. The front end arrangement is then connected to the selected storage brick storing the selected data. A hash code key queue is searched for the hash code from the selected data. The selected data is retrieved from the storage brick when the hash code of the selected data is in the hash code key queue.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION OF THE PREFERRED EMBODIMENTS

Figure 1:
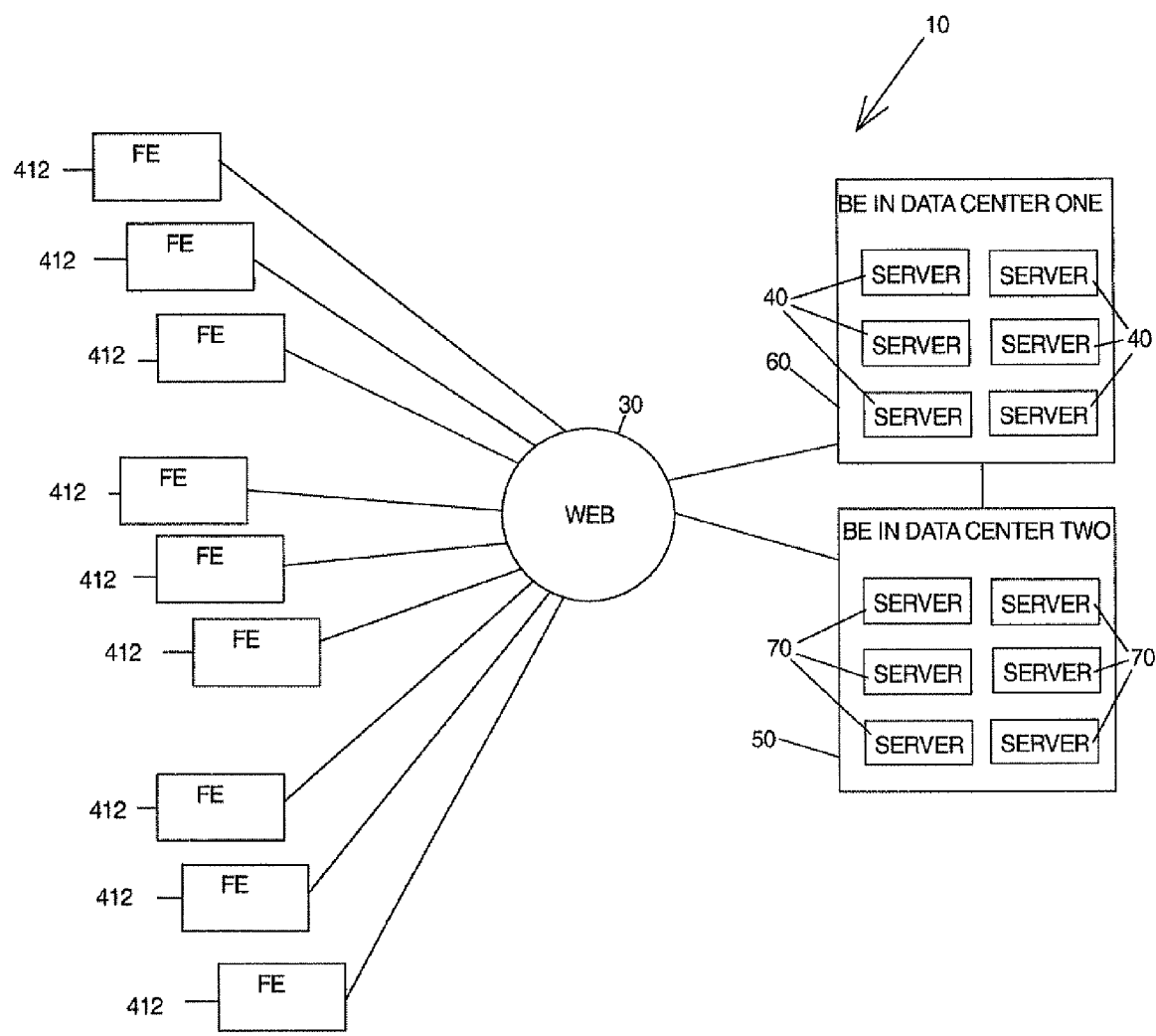
FIG. 1 illustrates an online backup system according to one embodiment of the invention having multiple front end arrangements connect to back end arrangements to perform backup and restore operations.

In its broadest aspects, the present invention provides an online backup system and method in which the system creates and implements a distributed hash table for backup procedures. It will also be understood that the present invention provides methods and systems that may be practiced on a conventional computer system, which itself may comprise a server, computer, or any device or group of devices, e.g., a cloud, that may be configured to transmit, receive, and/or store data are suitable for use in connection with the invention. A computer may include one or more processors, which may be connected to a wired or wireless communication infrastructure (e.g., a communications bus, cross-over bar, local area network (LAN), or wide area network (WAN)). Processor(s) may be any central processing unit, microprocessor, micro-controller, computational device, or like device that has been programmed to form a special purpose processor for performing the computer functions. In some embodiments, processor(s) may be configured to run a multi-function operating system.

Memory may be a local or working memory, such as, a random access memory (RAM) while secondary memory may be a more persistent memory. Examples of secondary memory include, but are not limited to, a hard disk drive(s) and/or removable storage drive(s) representing a floppy disk drive, a magnetic tape drive, an optical disk drive, or the like. A removable storage drive, if employed, may read from and/or write to a removable storage unit. Removable storage unit(s) may be a floppy disk, magnetic tape, CD-ROM, DVD-ROM, optical disk, ZIP™ drive, blu-ray disk, and the like, which may be written to and/or read by a removable storage drive. In some embodiments, secondary memory may include other similar devices for allowing computer programs or other instructions to be loaded into a computer, such as, a removable storage device and an interface. An example of such a removable storage device and interface includes, but is not limited to, a USB flash drive and associated USB port, respectively. Other removable storage devices and interfaces that allow software and data to be transferred from the removable storage device to a computer may be used.

A conventional computer system may also include a communications interface that allows software and data to be transferred between a computer and external devices. Examples of communications interface may include a modem, a network interface (such as an Ethernet or wireless network card), a communications port, a Personal Computer Memory Card International Association (PCMCIA) slot and card, or the like. Software and data transferred via a communications interface are in the form of signals which may be electronic, electromagnetic, optical, or any other signal capable of being received by the communications interface. These signals are provided to the communications interface via a communications path or channel. The path or channel that carries the signals may be implemented using wire or cable, fiber optics, a telephone line, a cellular link, a radio frequency (RF) link, or the like.

It will be understood that the present invention may be embodied in the form of computer-implemented processes and apparatus for practicing those processes. The present invention may also be embodied in tangible machine readable storage media encoded with computer program code, such as random access memory (RAM), floppy diskettes, read only memories (ROMs), CD-ROMs, ZIP™ drives, blu-ray disks, hard disk drives, flash memories, or any other machine-readable storage medium, such that when the computer program code is loaded into and executed by a computer, the computer becomes a particular machine for practicing the invention. When implemented on a general-purpose processor, the computer program code segments configure the processor to create specific logic circuits. The invention may alternatively be embodied in a digital signal processor formed of application specific integrated circuits for performing a method according to the principles of the invention.

Referring to the attached figures one embodiment the proposed online backup system of the present invention provides a number of nodes each serving as a member of the distributed hash table. Each node participating in the distributed hash table may be a typical computer system with an internal hard drive used for storing data, as disclosed in exemplary form hereinabove. The distributed hash table may be partitioned horizontally into smaller parts called partitions, as described in FIGS. 5 and 6. Each partition will be stored on multiple nodes, called replicas, as described in FIG. 9, where each replica may be a conventional computer system. Each replica may have a number of internal hard drives that store a number of distributed hash table partitions. The size of the partitions may vary and may be changed for optimization purposes. Additionally, each partition will be stored on at least two different nodes (replicas) for redundancy and performance. Also, each replica may serve data blocks for backup and restore purposes. Furthermore, each partition will be stored in a flat file or in an embedded database file (block database—BDB) that holds the key/value pair. The data block (this is the value from the pair) itself may be in compressed and encrypted format.

When a partition size reaches a specified threshold level, a process, called splitting, is initiated, to ensure storage size of the individual data files. During the splitting process (FIG. 14) a block database (BDB) file from a replica is copied to a new file either on the same node, if there is enough disk space, or to a new node selected from a pool. During the splitting process there may be a write lock on the partition, the consequence of which is that new incoming blocks may be rejected for processing, although reading of the blocks may be allowed. Once the BDB file is copied to a new destination, a process, called a lazy delete, may be initiated. During the lazy delete, data is removed that should not be present in the database file. The lazy delete has lower priority than other functions so no write or read requests are denied.

In some embodiments of the invention, backup procedures are performed (FIGS. 10 and 12) in which the front end arrangement creates a list of files to be backed up based upon an end user selection. The selections are stored on a local database. The policy may or may not be locked based on a setting from the back end arrangement. The policy includes what must be backed up, when and how. On Windows-based operating systems for example, when the version permits, Volume Shadow Copy Service may be used. If permitted, the backup may be performed as a "back up now and send later" procedure. If such setting is made, the backup will make a persistent snapshot of the file system, and will start sending data to the back end arrangement whenever possible. During backup, the front end arrangement will have a list of items to be processed. The front end arrangement will simultaneously open a number of files and will read the files for backup. When reading the files, the front end arrangement will divide the file into smaller pieces, called blocks, with dynamically adjusted block size. The default size for files up to 10 MB is 4 kB, for larger files the block size may increase. This setting can be changed through a graphical user interface.

The front end arrangement determines if this operation is a first backup of the file based on the information stored in the local database. If this operation is the first backup for the data, the front end arrangement will compute a rolling signature and a full hash (SHA-1), and will submit a request to the back end arrangement to determine if the block exists on the backend arrangement. If a block with such signature exists on the backend arrangement, the front end arrangement will record the signatures in its local database and continue to the next block. If the signature does not exist on the back end arrangement, the front end arrangement may compress the block using an algorithm, such as a zlib algorithm. The block may then be encrypted, sent and stored on the back end arrangement. After confirmation is received that the data has been stored, the front end arrangement will record the block signatures in a local database. If this is not the first time the file has been backed up, the front end arrangement performs deduplication based on an rsync algorithm. This process identifies blocks that have been previously backed up and that remain unchanged and will not process them further. When the last block of the file is processed, the front end arrangement computes a full file signature based on all the block signatures and records the information in a local database.

During restore activities (FIGS. 11 and 13) the front end arrangement determines what files are needed to be restored from an end-user selection on a graphical interface. Once this selection is made, the front end arrangement will find the needed signatures from the local database. The front end arrangement then submits a request for the needed block to the back end arrangement. The back end arrangement then processes the request of the front end arrangement by obtaining the needed blocks from multiple nodes. Encryption technologies used for saving and retrieving the respective files may be AES256 encryption. When the server daemon receives the request for the block it determines what partition holds the block based on the block signature. The server then requests the block from the replicas that hold this partition. Once the block is obtained then the server daemon sends it to the front end arrangement.

In methods and embodiments where the front end arrangement sends blocks to the back end arrangement server daemon, the server daemon may send the block together with its signature to the storage node to be saved in the BDB file. This save block operation is performed as a two phase commit protocol. The two phase commit protocol is a distributed algorithm that lets nodes in the system agree to commit to a transaction. The participating nodes are all the members of the partition. Once the block is saved in the BDB file for all the replicas in the partition, the front end arrangement may receive a confirmation of the save from the back end arrangement and the process continues with the next blocks. A test may then be performed to see if the last block has been processed. When the last block of a file is processed, the front end arrangement records the metadata for the file in its database and ends the process. The metadata may include, in a non-limiting embodiment, the files' name, the file containing folder, date and time, and file signatures. If the last block has not been processed, the method continues until the last block is completed.

Figure 15:
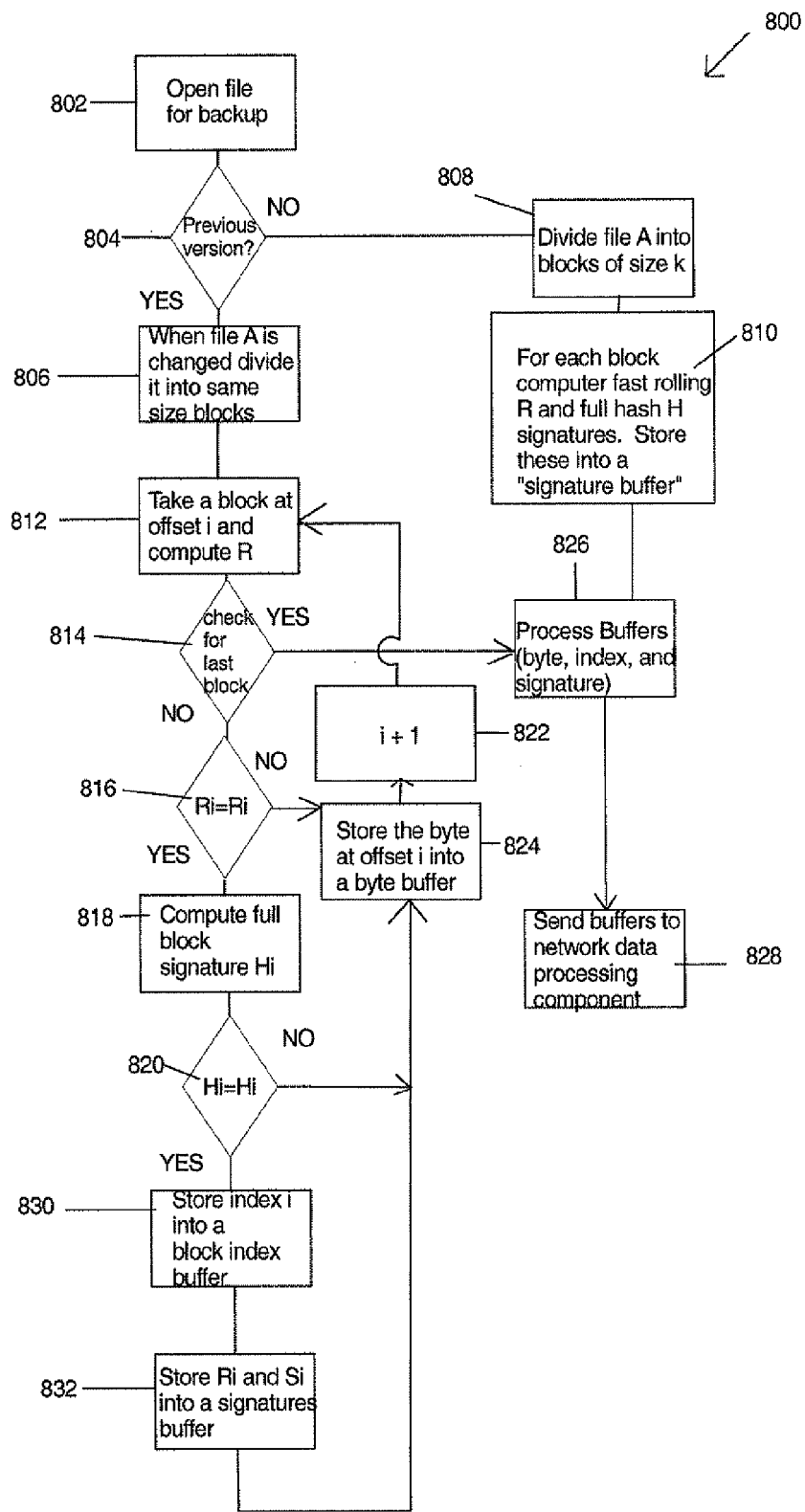
FIG. 15 is a flow chart for a delta algorithm that provides for global deduplication of files previously stored on a computer system.

A procedure of the invention may also determine if the files to be processed are new, i.e., they have not been backed up previously. If the files are new, they are processed, as previously described. If the currently processed files are not new, an rsync algorithm is used to determine the changed blocks. This is a second stage global deduplication. This method allows the front end arrangement to determine changed data within the changed files. Using rolling and full signatures, the rsync algorithm used by the front end arrangement is able to determine changed blocks even at different offsets. The new blocks, i.e., changed blocks, are processed as done during a normal backup. The existing blocks offset is recorded in the front end local database together with their rolling and full signatures. A delta algorithm may also be applied (FIG. 15).

Referring to FIG. 1, a back up system 10 is provided in which multiple front end arrangements 412 are connected to the internet or a web 30 that in turn is connected to back end data arrangement one 60 and a back end arrangement two 50. Each of the back end arrangements 50,60 have associated servers 40,70, respectively, performing storage and retrieval tasks. Information may be transferred to and from front end arrangement 412 to the back end data arrangements 50, 60 through web 30. The front end arrangements are configured to interface with end users for storage and retrieval of information.

Figure 2:
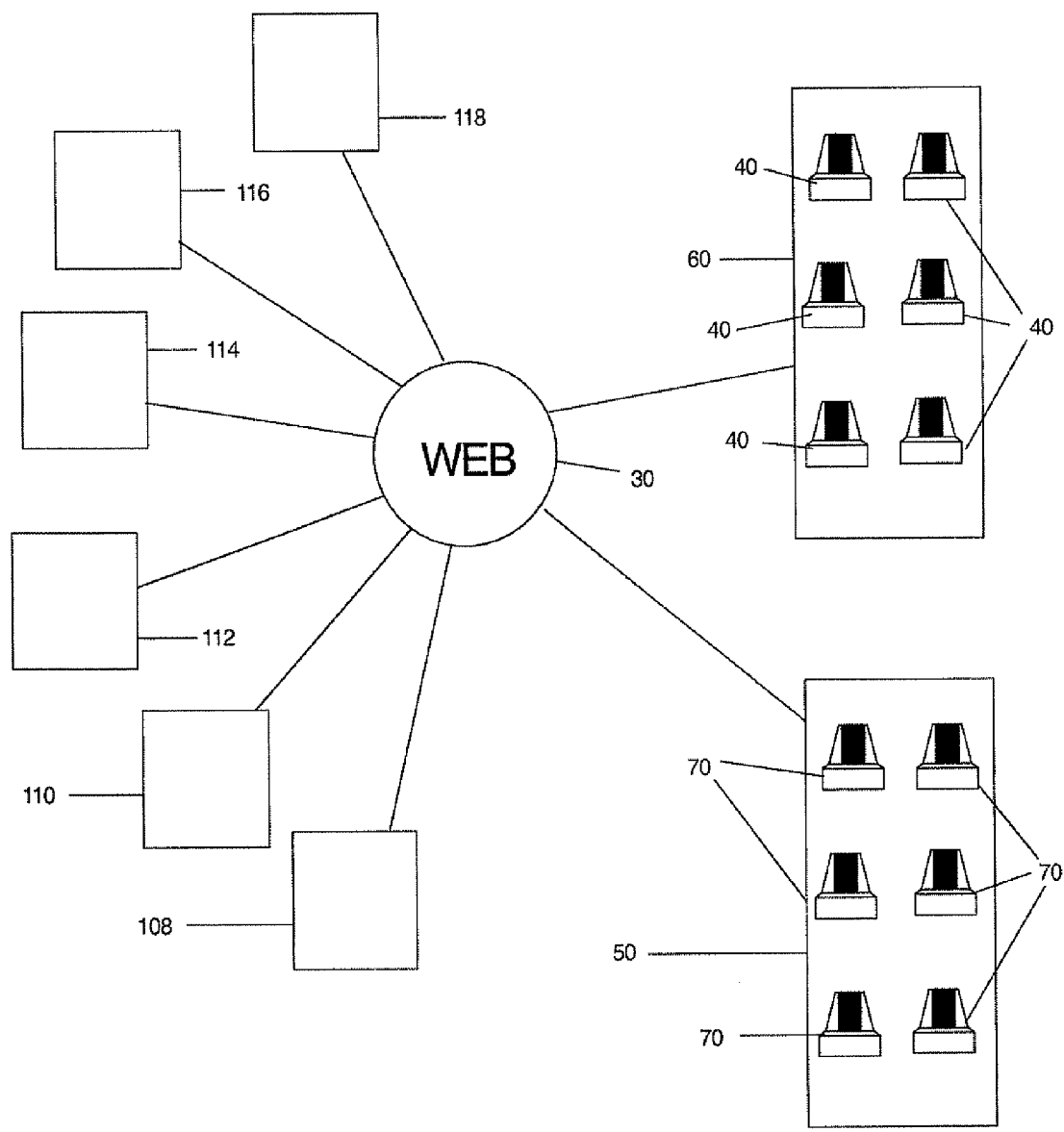
FIG. 2 illustrates another embodiment of an online backup system that can be implemented to protect a single computer or laptop, a small or medium business or an enterprise.

Referring to FIG. 2, different institutions may be connected to different back end arrangements. In this embodiment, institutions, such as a small business office 108, a personal computer 110, a governmental entity 112, a town 114, an educational institution 116 and a home 118 may be connected through web 30 to different servers 40, 70 for a back end arrangement one 50 and a back end arrangement two 60. The different institutions may also be interconnected among themselves through internet/web 30.

Figure 3:
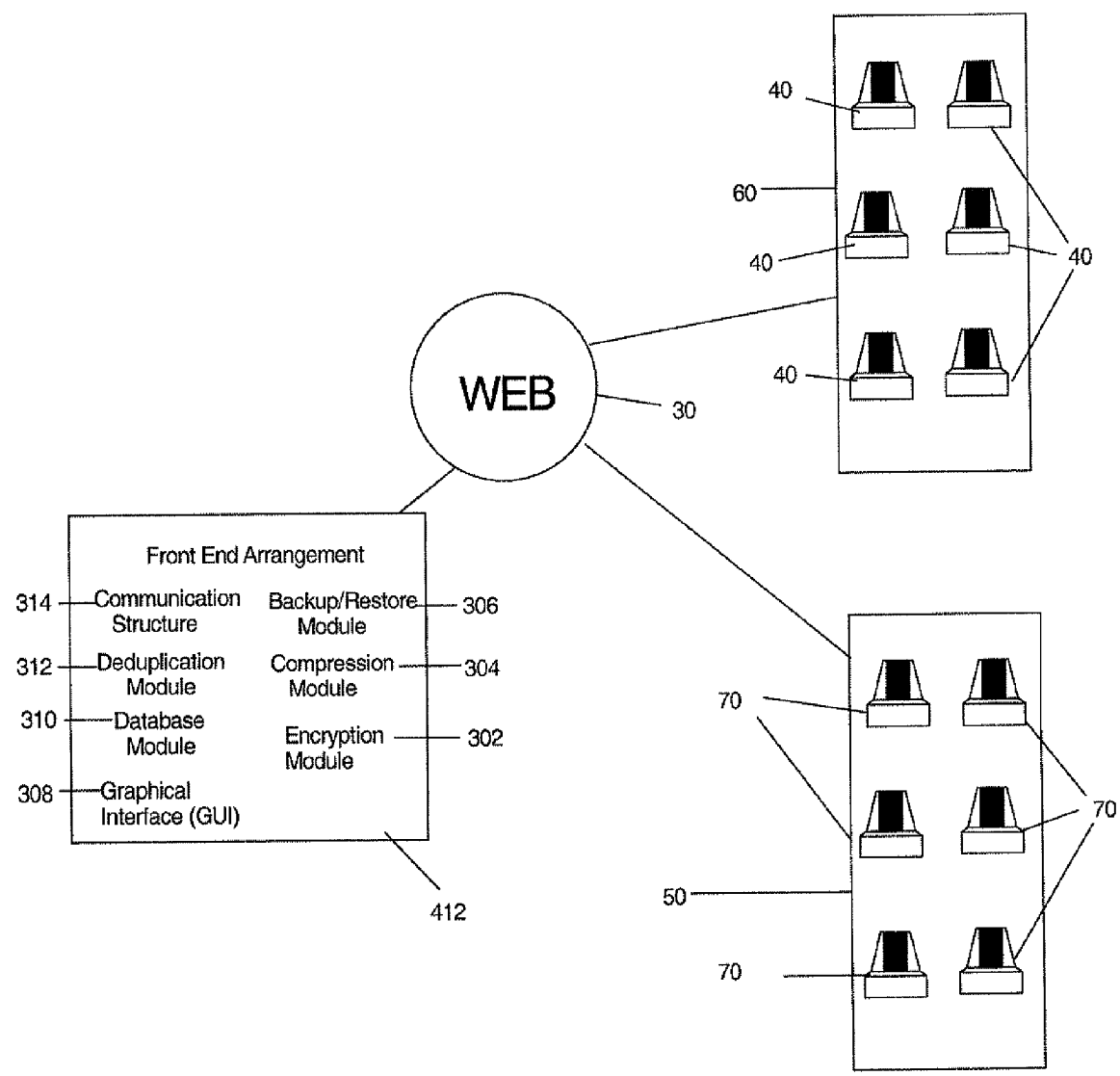
FIG. 3 illustrates the components of the front end arrangement.
Figure 4:
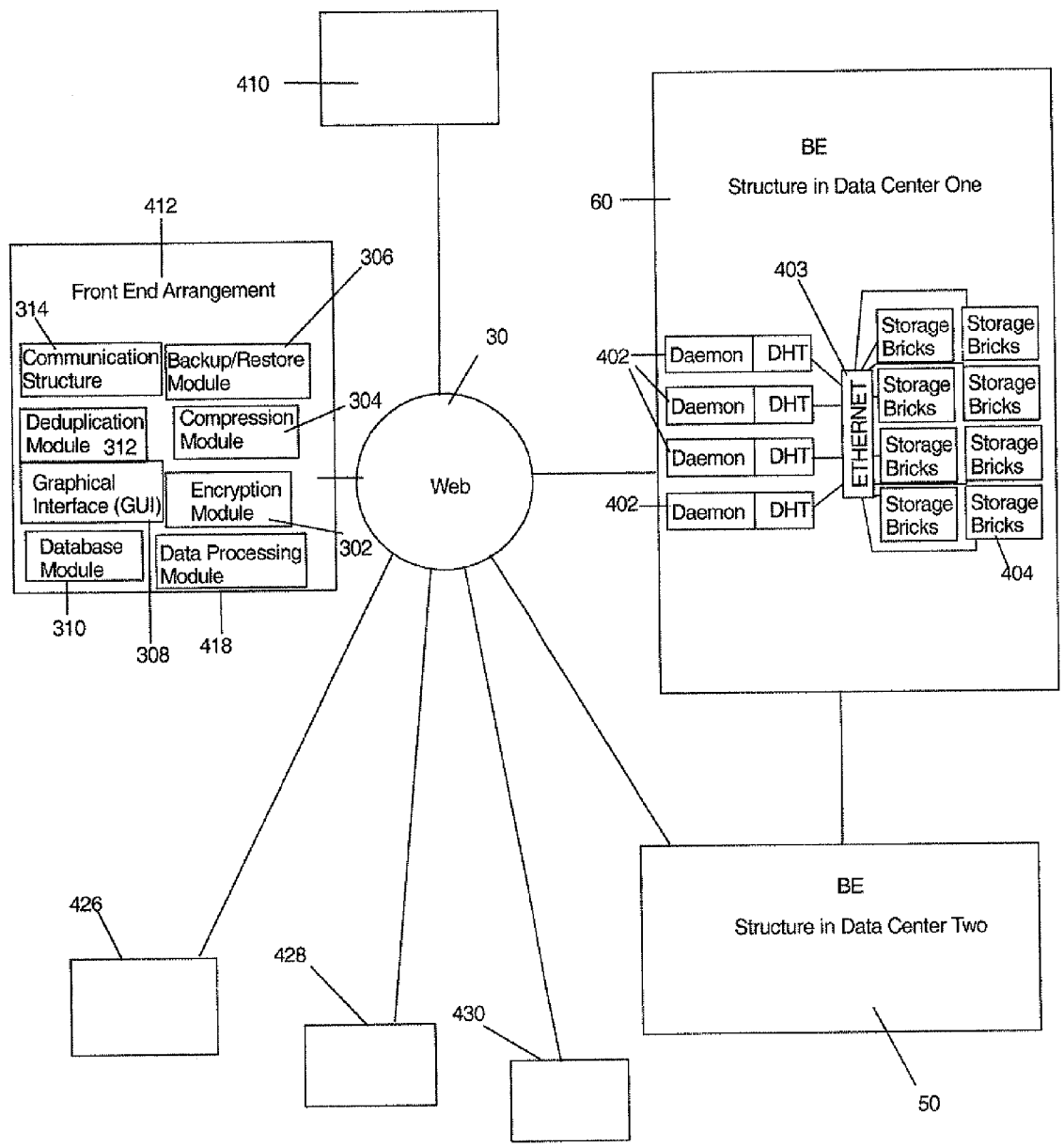
FIG. 4 illustrates the components of the front end arrangement and the back end arrangement.
Figure 5:
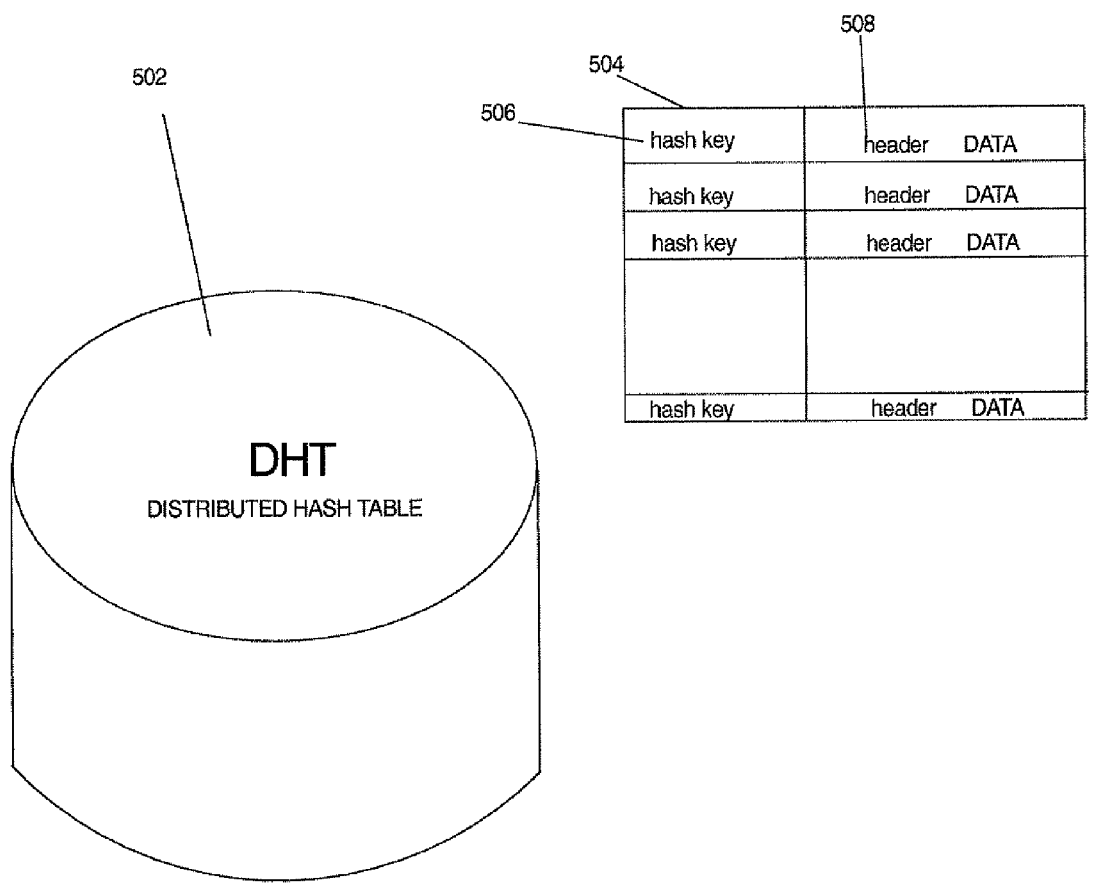
FIG. 5 illustrates a view of a distributed hash table which stores a pair of key/values when the key is a 20 byte long SHA-1 signature, and the data is a block that is stored in a compressed and encrypted format.

Referring to FIGS. 3 and 4, front end arrangement 412 provides a communication structure 314, a deduplication module 312, a database module 310, a graphical user interface 308, a backup/restore module 306, a compression module 304 and an encryption module 302. This front end arrangement 412 may be connected to internet/web 30 for interaction with servers programmed to store data obtained from a user as previously described. The front end arrangement 412 is arranged such that it interacts with the internet/web 30 so that information may be transmitted between the two (FIG. 4). The front end arrangement 412 is configured with a communication structure 314, a backup/restore module 306, a deduplication module 312, a compression module 304, a database module 310, an encryption module 302, a graphical interface 308. In an alternative embodiment, a separate data processing module 418 interacts with the database module 310. A back end data arrangement one 60 is configured such that individual back end daemons 402 interact with a gigabit Ethernet 403 so that individual storage bricks 404 may be addressed by daemons 402. A similar structure may be provided in back end data arrangement two 50. The front end arrangement 412 may address an individual personal computer 426, a home 410, a business 428 or a town/institution 430. The addressing or collection of data from individual personal computer 426, home 410, business 428 and town/institution 430 by the front end arrangement 412 allows data to be sent through internet/web 30 to back end arrangements 50, 60. Each of the daemons 402 forms a distributed hash table 502 that provides space for data that is to be stored through use of a hash key 506 with associated header and data 508 as (FIG. 5). Daemons 402 and their associated distributed hash tables 502 are connected to storage bricks 404 through gigabit Ethernet 403, in one non-limiting embodiment.

A distributed hash table 502 utilized by the server daemon 402 allows for data to be stored in the individual storage bricks 404 through a transfer arrangement, in this instance, a gigabit Ethernet 403 (FIG. 5). Thus, working with distributed hash table 502, information is transferred to storage bricks 404 in a secured encryption method since a key is used for storage of data in storage bricks 404. When requested by front end arrangement 412 to retrieve information from storage bricks 404, the information in distributed hash table 502 is used to identify information in storage bricks 404. Distributed hash table 502 may comprise several different components, and often takes the form of a lookup/searching service in which individual storage bricks 404 may be addressed for storage and retrieval of information. Hash key 506 may be a set of data, such as, a 160 bit string of data. In the one embodiment, the SHA-1 hash of the data is used as hash key 506 and linked to the data to be stored 508. The entire packet of the SHA-1 hash of data 506 and the data itself is forwarded to storage bricks 404. When a user wishes to retrieve the data stored in storage bricks 404, hash key 506 is used for searching storage bricks 404. Upon searching and hitting a successful hash key 506, data 508 is retrieved from storage bricks 404 and sent through web 30 to front end arrangement 412. The data from storage bricks 404 are assembled using encrypted data from a metadata database. This information is encrypted to allow for storage security.

Each of the sites that can address data, such as the back end arrangement data centers, referred to as nodes, and may allow for connection to other nodes in an overlay network. In one embodiment, a network topology is created.

Figure 6:
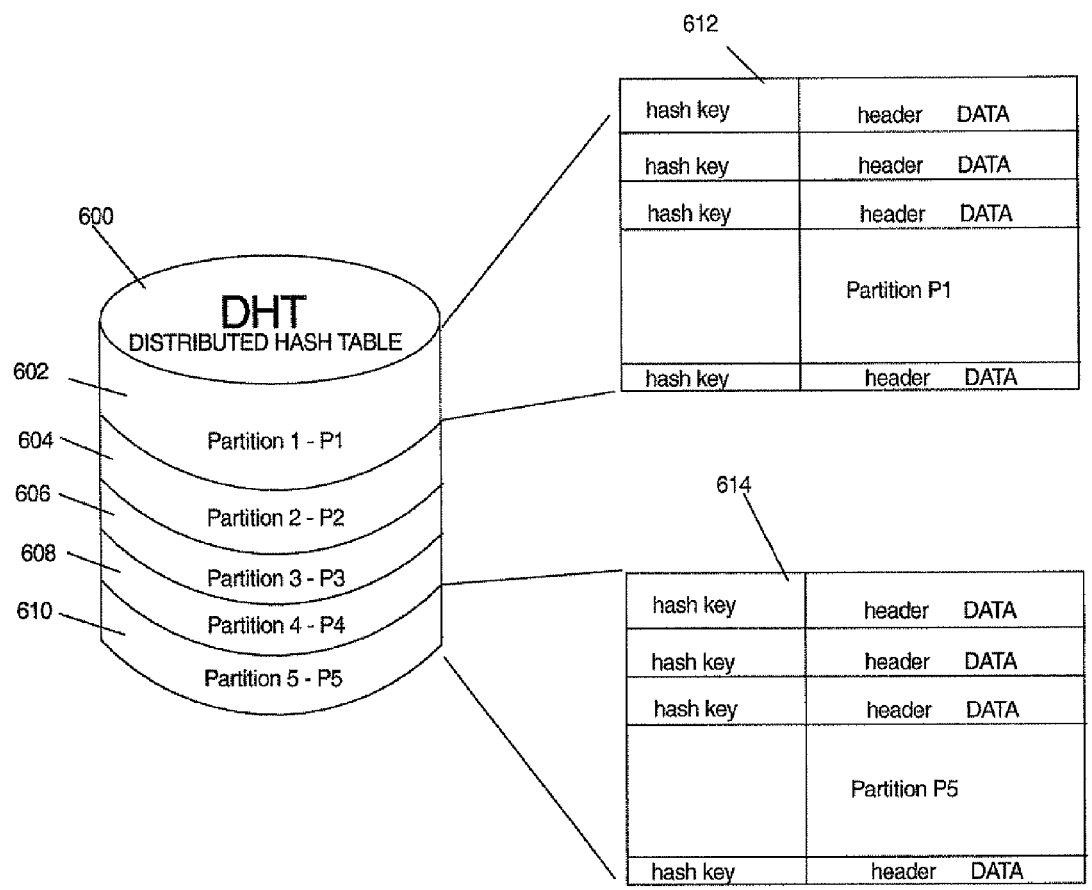
FIG. 6 illustrates horizontal partitioning of a distributed hash table wherein the distributed hash table is divided into smaller partitions.

Referring to FIG. 6, in one embodiment, a distributed hash table 600 may be broken into separate partitions 602, 604, 606, 608 and 610. Although illustrated as being separated into five partitions, it will be understood that such an arrangement of partitions is merely illustrative and more or less partitions may be created in the distributed hash table 600 without deviation from the scope of the present invention. As with other embodiments, each of the partitions has data separated into both a hash key and data subset 612, 614.

Figure 7:
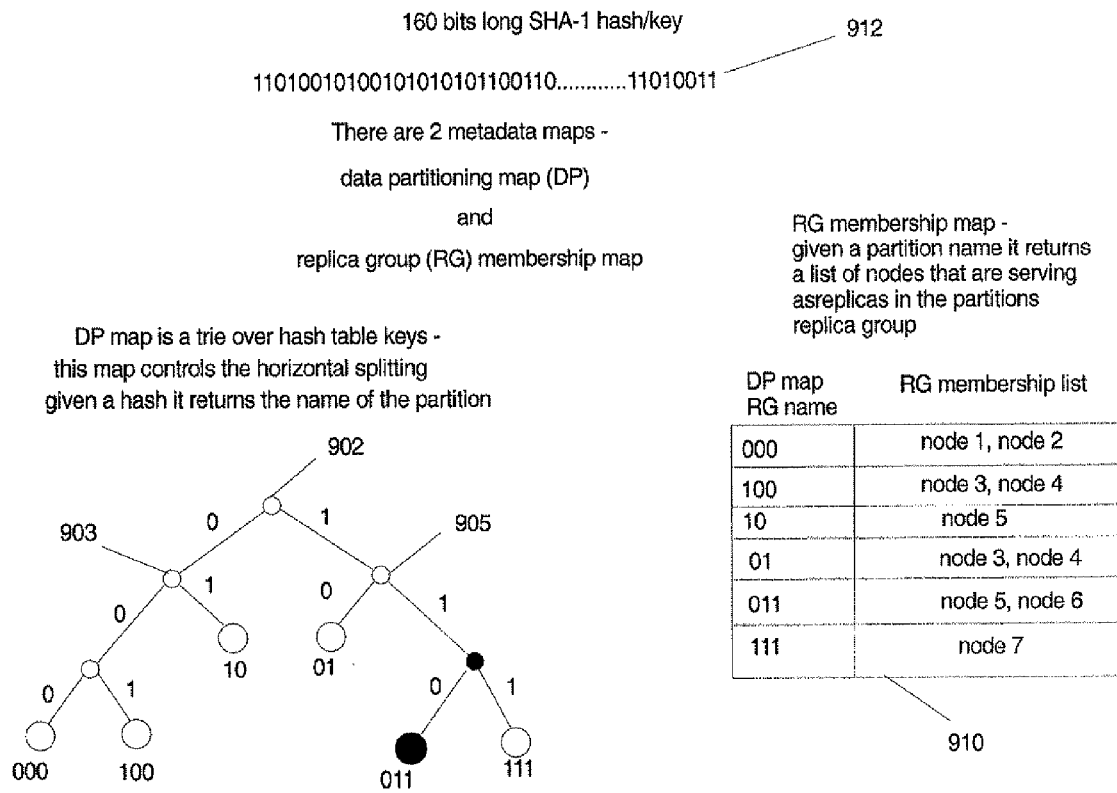
FIG. 7 illustrates splitting of a partition from the distributed hash table.
Figure 8:
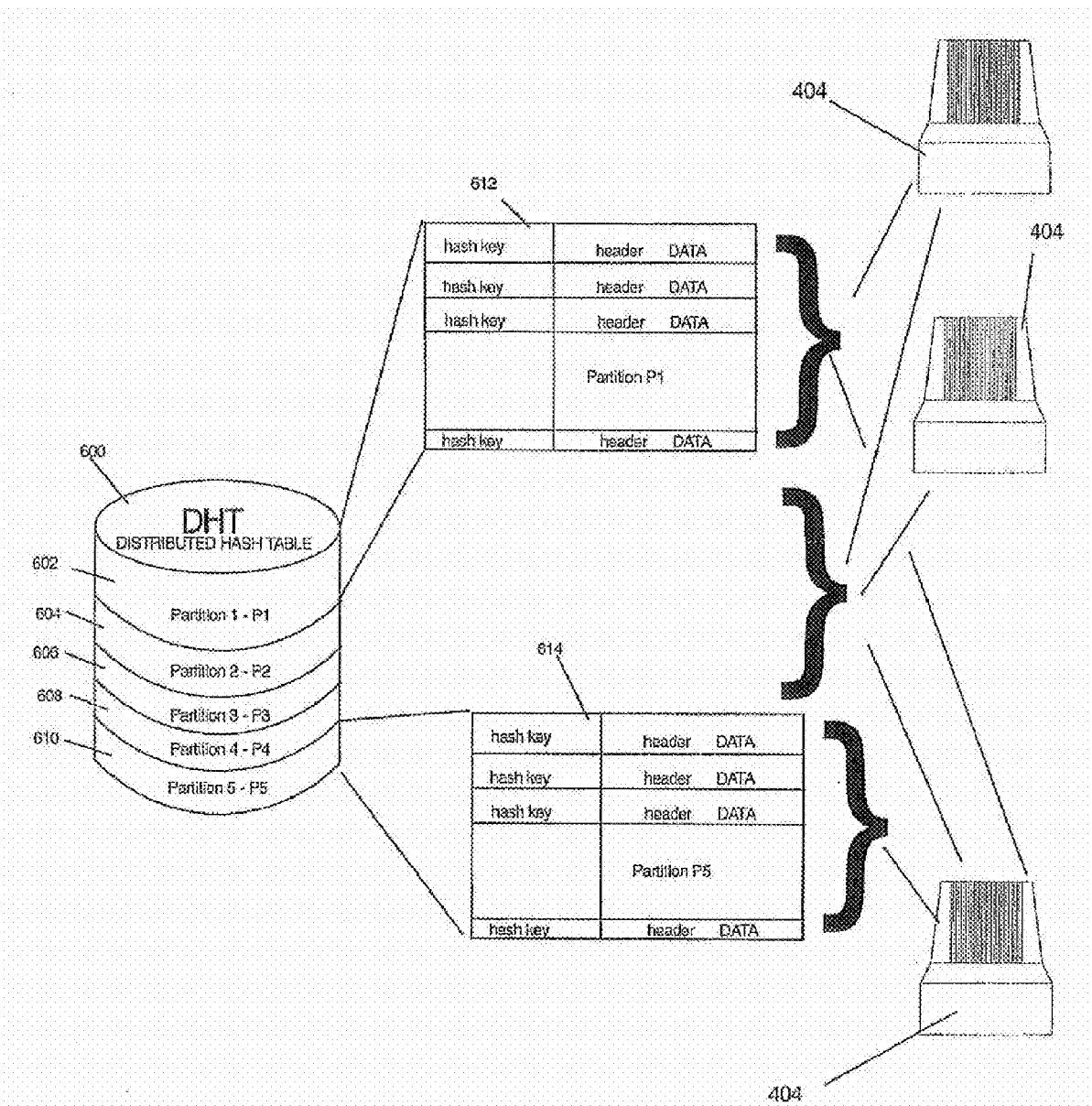
FIG. 8 illustrates how each member of the distributed hash table stores numbers of partitions from the distributed hash table.

Referring to FIG. 7, a splitting of a partition is provided, at 902, where the initial configuration of the distributed hash table is made of two partitions. Here, the last significant bits are zero and partition one where the last significant bit is one. When one of the partitions reaches a threshold value for size, a split is initiated by system 10. During the split, the partition is divided into two new partitions. For example, partition 0 is divided into 00 and 10, at 903, while partition 1 is divided into 01 and 11, at 905. The partition name is also the name of the BDB file. The scheme data partition map is called the DP map. The node membership is recorded in a replica group map (RG map). Both maps, DP and RG, are often stored in a flat indexed file or in an embedded block database BDB file. Each participating node from the back end arrangement has a copy of the replica group map and the data partition map. A map of all of the divisions is provided in the chart, at 910. The hash key 912 is a combination of data from the replica group map and the data partitioning map. Each of the partitions 602, 604, 606, 608, 610 in the distributed hash table 600 may be connected to an individual storage brick 404 that provides for storage of the data (FIG. 8). Data can be stored or retrieved according to the identifiers of the hash key and data stream that is provided.

Figure 9:
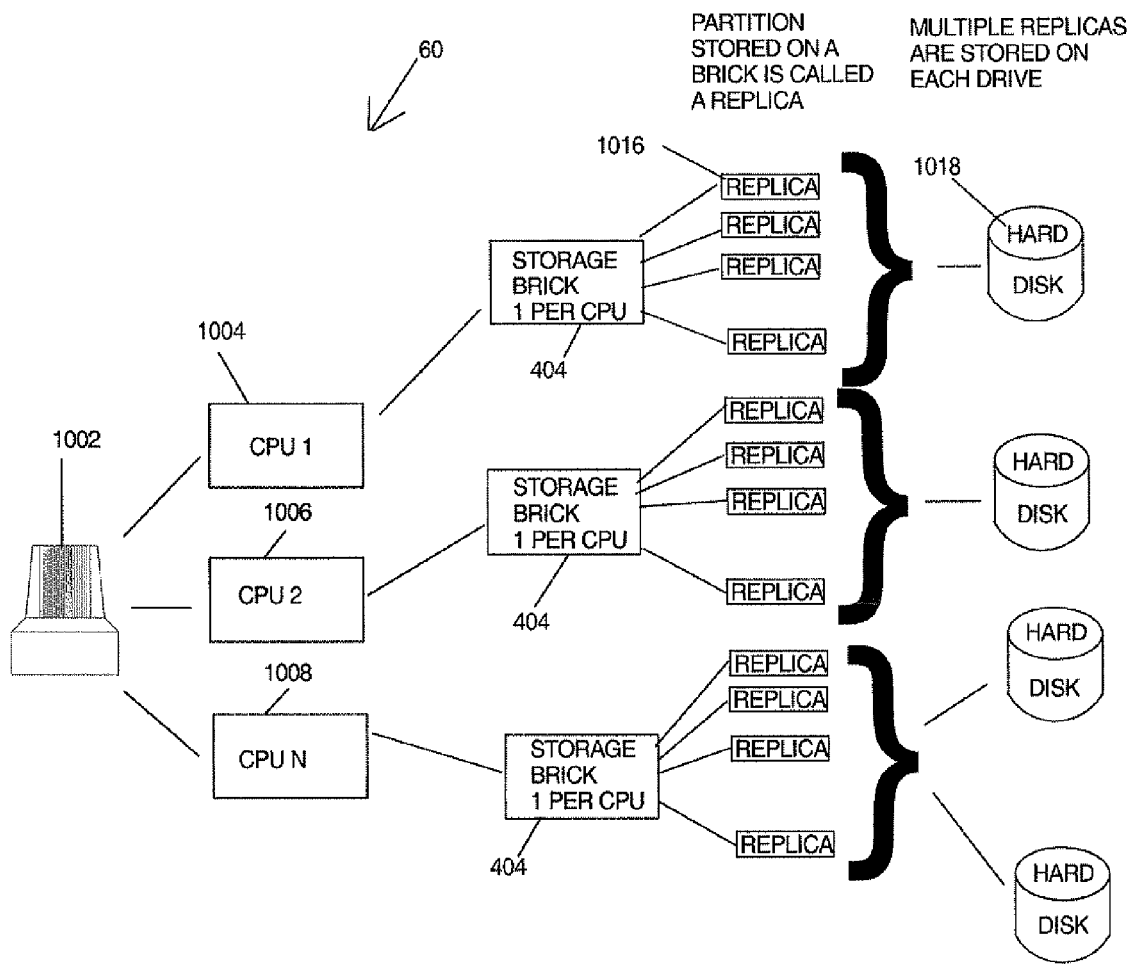
FIG. 9 illustrates the structure of the back end arrangement, wherein each node has N numbers of central processing units and at least four hard drives.

A structure for the back end data arrangement 60 is provided where each node 1002 has N number of central processing units, in this case three 1004, 1006 and 1008 and at least four hard disk drives 1018 (FIG. 9). Each central processing unit 1004, 1006 and 1008 is connected to a storage brick 404 that may correspond to a number of replicas 1016. In one embodiment, each hard disk drive 1018 stores a number of replicas 1016. The number of replicas stored depends upon the size of disk drive 1018 and the size of the partition. In one example embodiment, a drive 1018 of approximately one Terabyte capacity will store eight-hundred partitions of the Distributed Hash Table, each being approximately one Gigabyte in size. In this embodiment, there is an eighty percent threshold value limitation for material to be stored verses the capacity of hard drive 1018. The threshold value and the size of the partition can be changed through a graphical user interface 308.

Figure 10:
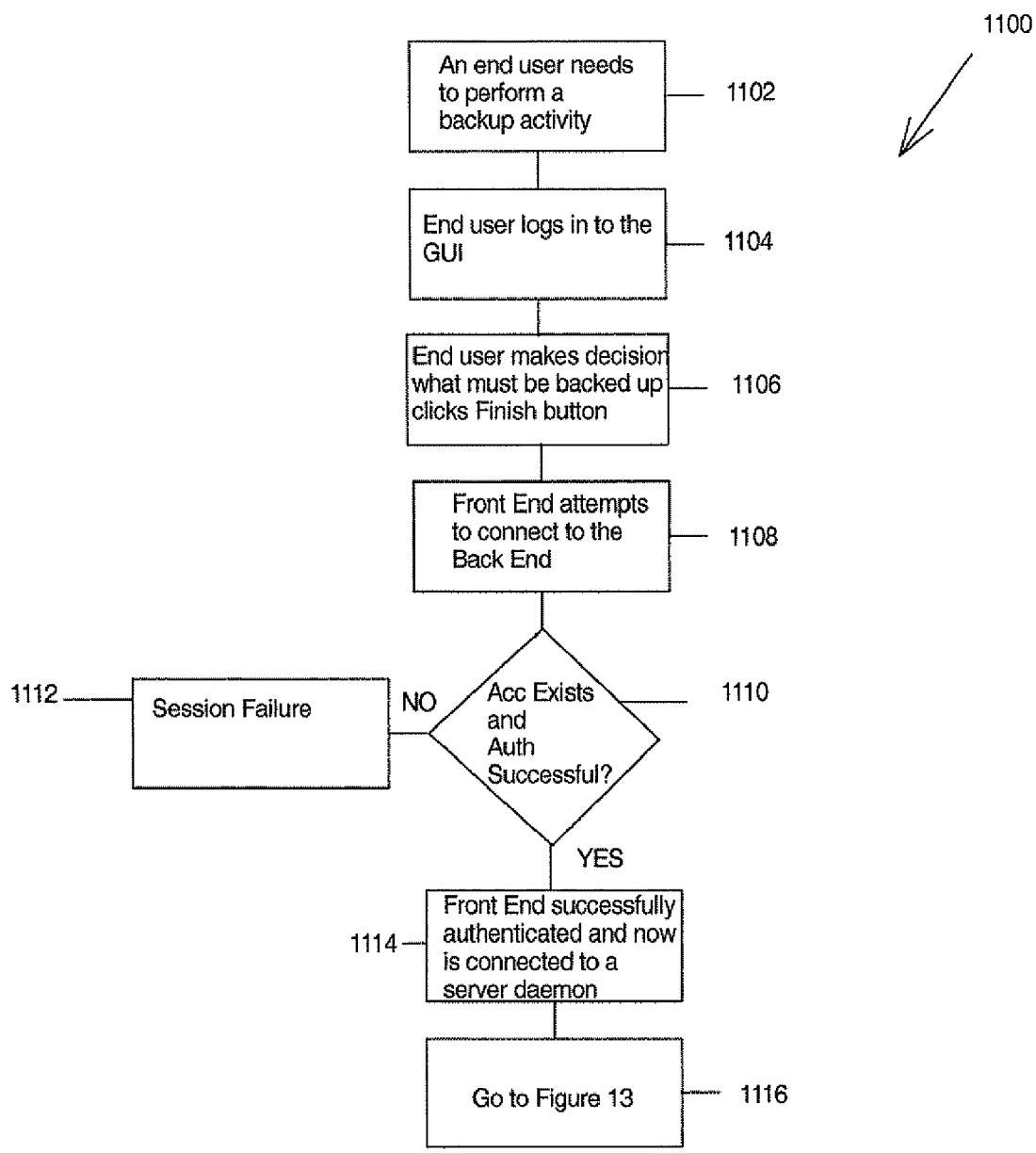
FIG. 10 illustrates a flowchart for backup activities between the front end arrangement and the back end arrangement.

An end user may need to perform a backup activity at step 1102 (FIG. 10). The end user would log into a graphical user interface 308 to initiate the backup activity, at step 1104 (as shown in FIG. 10, by way of a flowchart for backup activities 1100 between a front end arrangement 412 and a back end arrangement 50, 60). The end user then makes a decision as to what must be backed up via graphical user interface 308, and clicks the "Finish" button at step 1106. Front end arrangement 412 then connects to back end arrangement 50, 60, at step 1108. Back end arrangement 50, 60 then checks to determine if the end user is an authorized user, at step 1110. System 10 checks if there is a valid account and if the user is authorized. If the user is not authorized or the account does not exist, then there is a session failure at step 1112, and no further activities occur. If the account exists and there is a successful authorization, front end arrangement 412 successfully authenticates the session and front end arrangement 412 is connected to the server daemon for the back end, at step 1114. The process then continues at step 1116 (FIG. 12).

Figure 11:
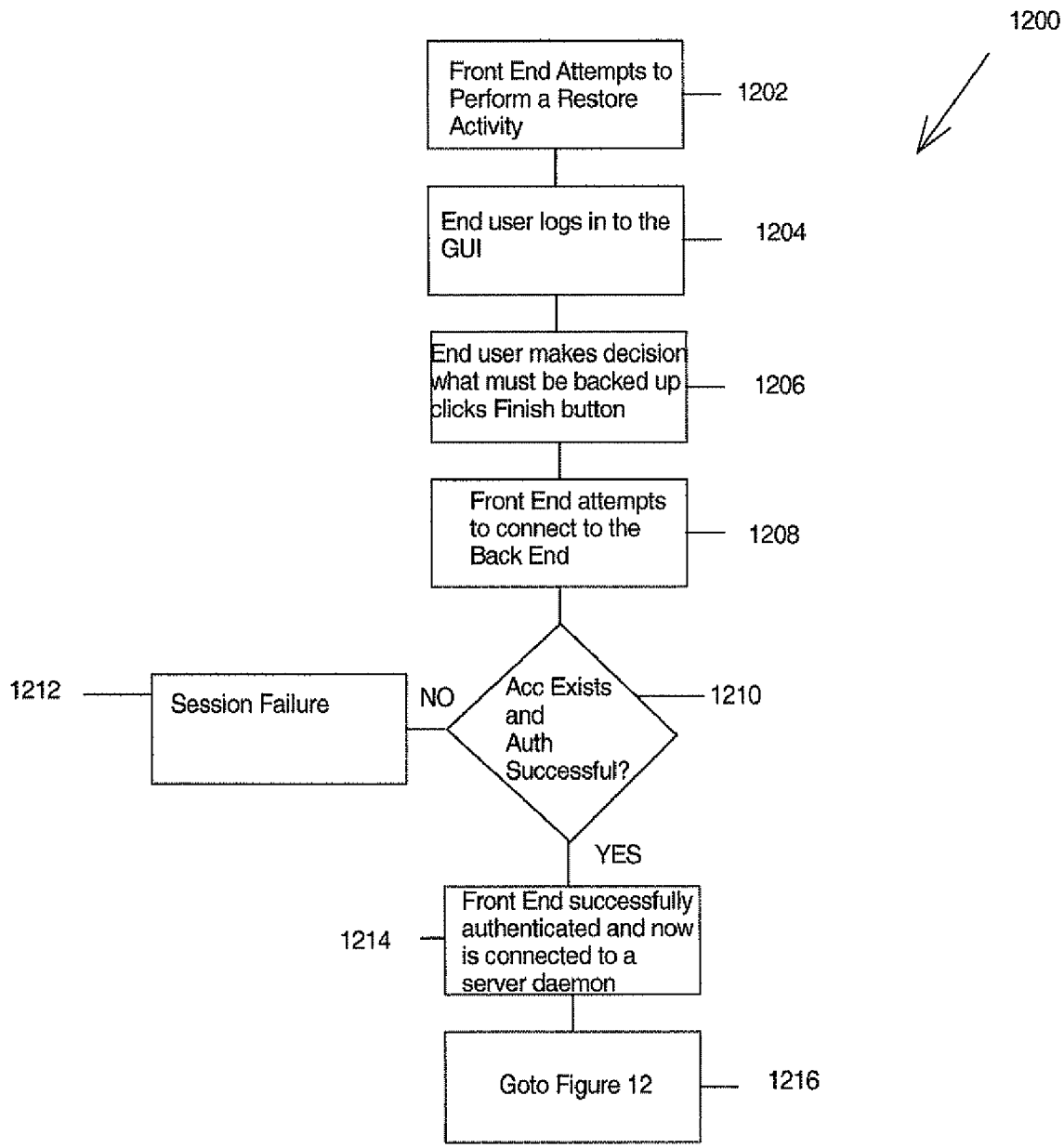
FIG. 11 illustrates a flowchart for restore activities performed by the front end arrangement and the back end arrangement.

The end user logs into a graphical user interface 308 to initiate the backup activity, at step 1204 (as shown in FIG. 11 by way of a flowchart for restoration activities 1200 between a front end arrangement 412 and a back end arrangement 50, 60 as initiated by an end user). The end user then makes a decision as to what must be restored on graphical user interface 308, and clicks the "Finish" button, at step 1206. Front end arrangement 412 then connects to back end arrangement 50, 60, at step 1208. Back end arrangement 50, 60 then checks to determine whether the end user is an authorized user, at step 1210. If the user is not authorized or the account does not exist, then there is a session failure, at step 1212, and no further activities occur. If the account exists and there is a successful authorization, front end arrangement 412 successfully authenticates the session and front end arrangement 412 is connected to the server daemon for back end arrangement, at step 1214. The process then continues, at 1216 (FIG. 13).

Figure 12:
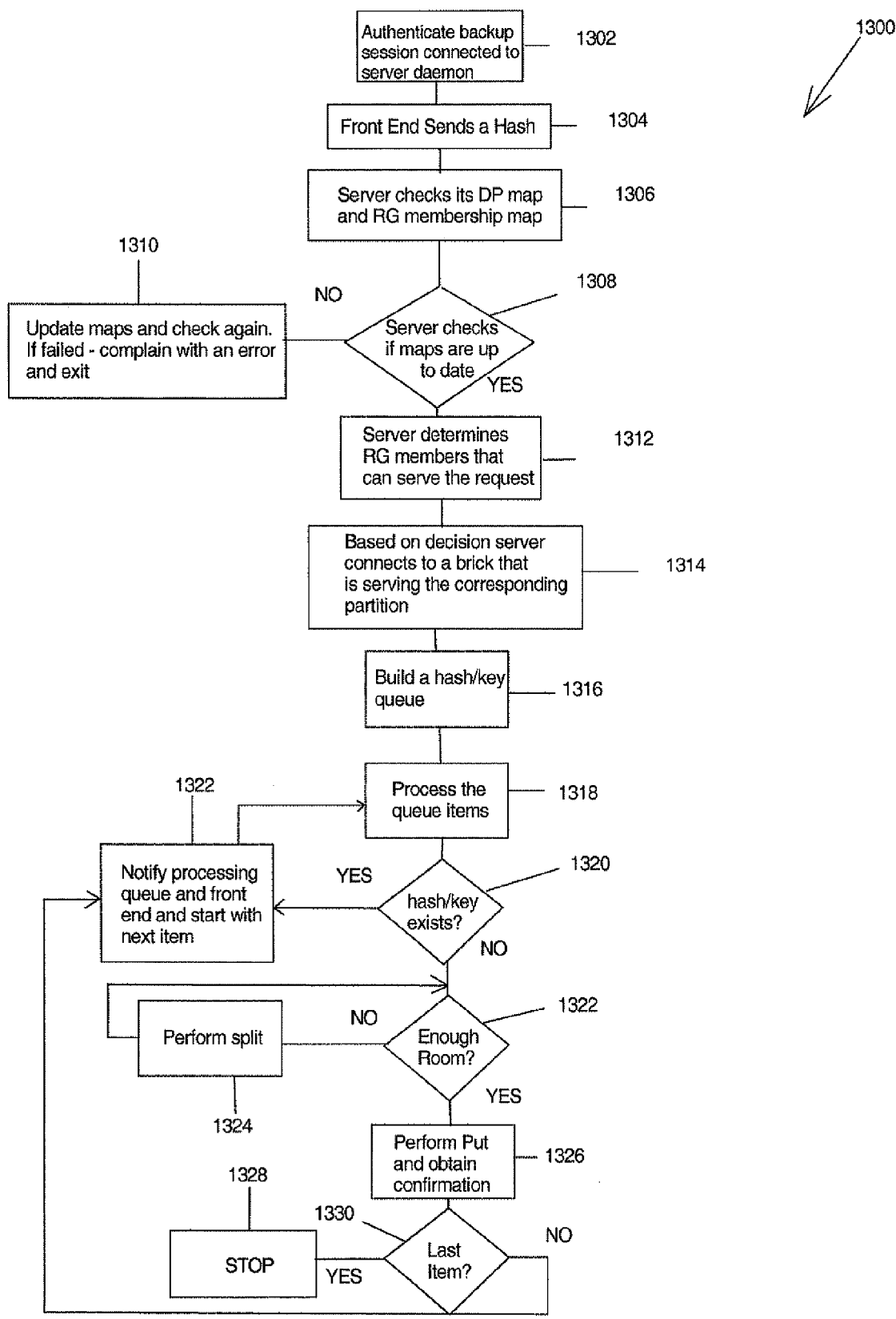
FIG. 12 is a flowchart for a backup activity performed by the front end arrangement and the back end arrangement.
Figure 14:
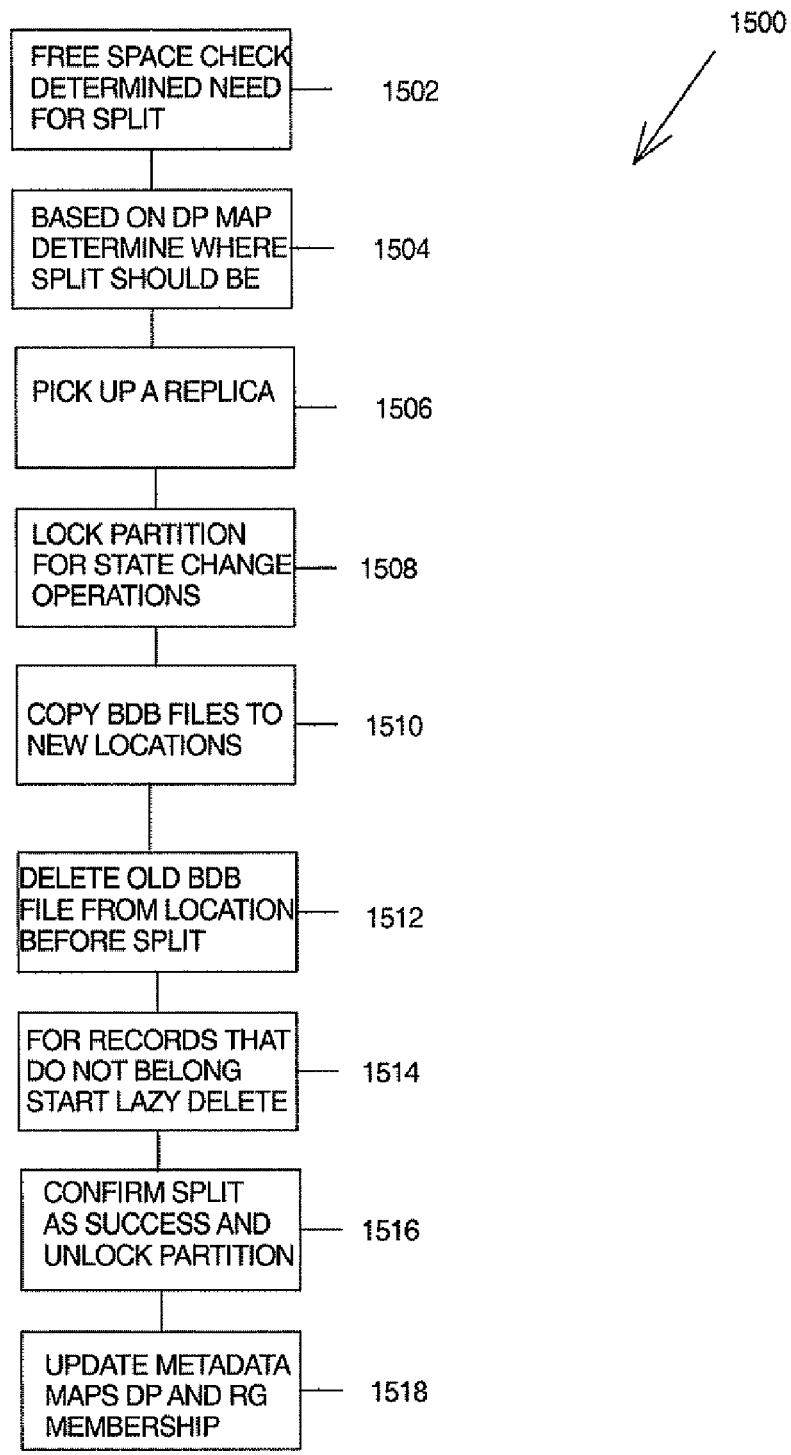
FIG. 14 is a flowchart for a split operation.

An authenticated backup session is started wherein the front end arrangement 412 is connected to a back end server daemon (FIG. 12). Front end arrangement 412 sends a hash key to back end arrangement 50, 60, in step 1304. Next, in step 1306, back end arrangement 50, 60 checks its DP map and RG membership map with the information received from front end arrangement 412, in step 1304. The server then checks to see if the DP map and the RG membership map are up-to-date, in step 1308. If the DP map and the RG membership map are not up to date, in step 1308, the DP map and the RG map are updated and a further check is attempted, in step 1310. If this check fails, in step 1310, then the program exits. If the maps are up to date, in step 1308, the back end arrangement 50,60, in step 1312, determines the RG members that can serve the request, i.e., which blocks may be used for storage. Following this process, at step 1314, based upon a round robin-type decision server, a storage brick 404 is chosen that serves the corresponding partition. A hash/key queue is then established by the system, at step 1316, and processed, in step 1318. If the hash/key already exists in the queue, as checked at step 1320, then the processing queue is notified and the next item in the hash/key queue is checked, where the method loops again to step 1318. If the hash/key does not exist in the queue, the data may be stored in storage brick 404 and a check is performed if there is sufficient storage room in storage brick 404, at step 1322. If there is not enough storage capacity in the storage brick 404, a split of the data is performed (FIG. 14). If there is sufficient data storage space, then information is stored, in step 1326. System 10 then checks, at step 1330, if the item being saved is the last block of data. If the item is not the last block of data, the method loops back to step 1318. If the item is the last block of data, the process stops at step 1328.

Figure 13:
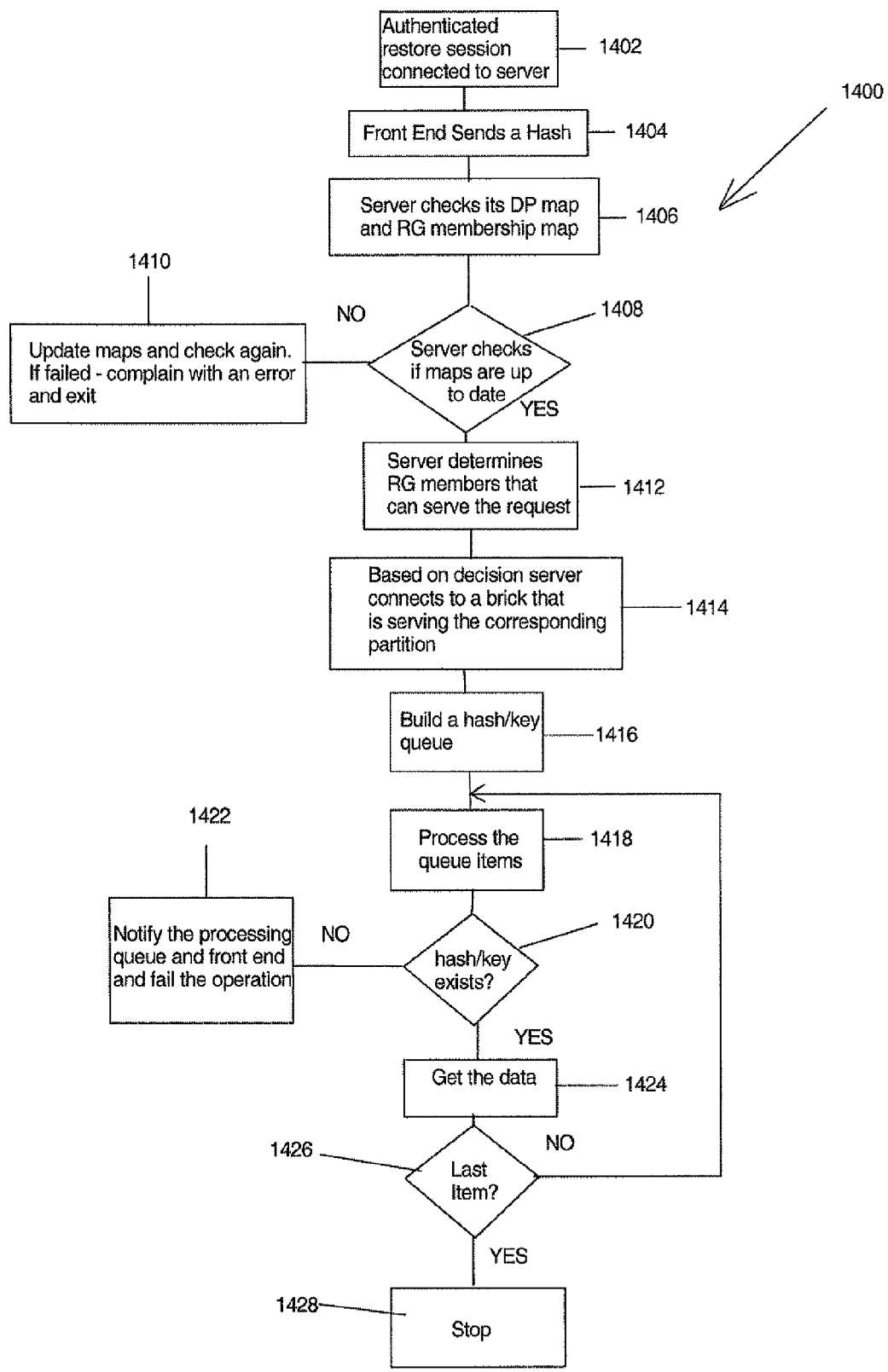
FIG. 13 is a flowchart for a restore activity performed by the front end arrangement and the back end arrangement.

A method 1400 is also provided for restoring information from a computer stored in a storage brick 404 in which an authenticated restore session is established by connecting a user logging in to a front end arrangement 412 and then, through back end arrangement 50, 60, connecting the user to a server daemon, in step 1402 (FIG. 13). In step 1404, front end arrangement 412 sends a hash to back end arrangement 50, 60. The server or other computing arrangement in back end arrangement 50, 60 then checks its DP map and RG membership map, in step 1406. In step 1408, the server checks to see if the maps received in step 1406 are up-to-date. If the maps are not up to date, in step 1410, the maps are updated and a further check is performed. If this check, performed in step 1410, is not successful, the program is exited. In step 1412, the server for back end arrangement 50, 60 determines the RG members that can serve the request. Based on a round robin-type decision server, a storage brick 404 is connected that services the corresponding partition based upon the information received from front end arrangement 412, in step 1414. Next, the process provides for building a hash/key queue, at 1416. When an individual wishes to recover items from the queue, in step 1418, a check is made in step 1420 to see if the hash/key exists in the queue. If the hash/key does not exist in the queue, the processing queue is notified at front end arrangement 412, and no further actions are undertaken, in step 1422. If the hash/key does exist in the queue in step 1420, the data is retrieved from storage brick 404, in step 1424. The process then checks to see if the last item has been processed/retrieved in step 1426. If the last item has not been processed, the method loops back to step 1418. If the item is the last item to be processed, the method stops at 1428.

Referring to FIG. 14, a method is provided 1500 for performing a split of information prior to storage in a storage brick 404. Free spaces in a storage brick 404 are checked to see if the data that is to be stored needs a split, in step 1502 (FIG. 7). At step 1504, based upon the DP map, the block is evaluated as to where the split for the data should occur. At step 1506, a replica is determined, and in step 1508, the partition is locked for change operations and to allow retrieval requests. The block database files (BDB files) are then copied to new locations, in step 1510. Previous or old BDB files are deleted from the location before a split occurs, in step 1512. For each BDB, records are determined to evaluate whether the records belong or need to be deleted, in step 1514. The split occurs, in step 1516, and a confirmation is generated for the partition. After storing of the information, in step 1516, the metadata maps DP and RG membership are updated with the information regarding the split, at step 1518.

A delta algorithm is applied to any file that has been previously backed up and is the second stage of the global two-stage deduplication, as shown by FIG. 15, by a flow chart 800 for a delta algorithm in which the algorithm determines if a block that has been previously saved has been altered in a subsequent version of the original block. A file is opened for backup 802, then a test is run by the system, at step 804 where the system checks to see if there is a previous version of the file in a defined database. If there is no previous version of the file in the database, the file is divided into blocks of a size k, in step 808. For each block, a rolling R signature is calculated as well as a full hash H signature. These values are stored in a signature buffer in step 810.

Process buffers are then created in step 826, and may be sent to network data processing components, in step 828. If a previous version of the file is in the database, at step 804, then the file is changed by dividing it into the same size blocks, in step 806. At step 812, a block is taken at offset I and the value of signature R is calculated. At step 814, system 10 checks to determine if the block being examined is the last block. If the block is the last block, then process buffers are calculated, at step 826. Buffers are then sent to network data processing components, in step 828.

If the check for the last block indicates that the last block has not been reached, then the system progresses where the value for the block to be saved is checked to see if the value has been previously stored, at step 816. If the value is not the same, then the data is stored at an offset I into a byte buffer, in step 824. The value I is then indexed upward and the process continues, at step 812. If the value has been previously stored, then a full block signature is calculated, at step 818. If the block signature has not been previously calculated in step 820, then the byte is stored in step 824 as previously described. If both Ri and Hi have been previously calculated, then the index I is stored in a block index buffer, in step 830, and the signature buffer is updated in step 832. I is an index for the offset, and is stored in the index buffer while the rolling R and full S signatures are stored in their own buffers. I is then incremented and the method continues to 812.

Potential attacks to corrupt data or attempts to retrieve data are impractical. Any individual wishing to get information/damage information would have to determine block signatures in order to access data. If an individual did guess the block signatures to reassemble portions of a file, the individual would find it impossible to reassemble all of the blocks together into a coherent pattern. The attacker, therefore, would have data that would be impossible to decipher, thereby adding security to the overall system.

In the foregoing specification, the invention has been described with reference to specific embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method for storing information on a computer, comprising:
    selecting data to be backed up on the computer;
    authenticating at least one of a user and an account for the data to be backed up on the computer;
    preparing a hash code for the selected data;
    sending the hash code for the data to be backed up from a front end arrangement configured to interface with a user to a back end arrangement;
    checking data of at least one of a scheme data partition map and a replica group membership map for the hash code obtained from the front end arrangement;
    determining which of a set of replica group members can service storage of the selected data in a storage brick;
    connecting the front end arrangement to the selected storage brick through the replica group members determined for storing the selected data;
    searching a hash code key queue for the hash code from the selected data;
    storing the selected data in the selected storage brick altering the memory of the storage brick when the hash code of the selected data is not in the hash code key queue; and
    updating the hash code key queue with the hash code from the selected data.

2. The method according to claim 1, further comprising:
    determining a maximum data block size to be saved of the selected data;
    checking a block size of the selected data with the maximum data block size; and
    storing the selected data when then maximum data block size is not exceeded by the block size of the selected data.

3. The method according to claim 2, further comprising:
    dividing the block size of the selected data when the maximum data block size is exceeded by the block size of the selected data.

4. The method according to claim 3, further comprising:
    checking a capacity of a storage brick to store data;
    comparing the capacity of the storage brick to the block size of the divided selected data; and
    storing the data of the divided block of the selected data when the capacity of the storage brick exceeds the block size of the divided selected data.

5. The method according to claim 3, further comprising:
    storing the divided block of selected data in a storage brick.

6. The method according to claim 5, wherein the storing the divided block is in an encrypted format.

7. The method according to claim 1, wherein the storing the selected data when the hash code of the selected data is not in the hash code key queue is in an encrypted format.

8. A method for restoring information saved in a memory of a computer, comprising:
    selecting data to be restored on the computer, the data previously stored on the computer;
    authenticating at least one of a user and an account for the data to be restored on the computer;
    sending a hash code from a front end arrangement configured to interface with a user to a back end arrangement for one of authenticated users and accounts;
    checking data of at least one of a scheme data partition map and a replica group membership map for the hash code obtained from the front end arrangement;
    determining which replica group members can access a storage brick containing the selected data;
    connecting the front end arrangement to the selected storage brick for storing the selected data;
    searching a hash code key queue for the hash code from the selected data;
    retrieving the selected data from the storage brick when the hash code of the selected data is in the hash code key queue; and
    visually displaying the selected data.

9. The method according to claim 8, further comprising:
    decoding selected data retrieved from the storage brick.

10. A method for dividing data to be saved on a computer, comprising:
    determining a free space in a storage brick memory for a computer system;
    selecting an original block of data to be saved on the computer;
    retrieving a scheme data partition map;
    determining a data separation point in the block of data to be saved on the computer based upon the scheme data partition map;
    locking the block of data by the computer system so that a state may not be changed of the block of data; and
    copying the block of data into portions of the storage brick memory as determined by the data separation point.

11. The method according to claim 10, further comprising:
    deleting the original block of data on the computer.

12. The method according to claim 10, further comprising:
    confirming the copying of the block of data into portions as determined by the data separation point.

13. The method according to claim 12, further comprising:
    unlocking the portions of the block of data.

14. The method according to claim 13, further comprising:
    updating at least a scheme data partition map and a replica group map with the copying of the block of data into portions.

* * * * *